United States Patent
Yu et al.

(10) Patent No.: US 10,006,668 B2
(45) Date of Patent: Jun. 26, 2018

(54) UNDERGROUND HEAT-EXCHANGE SYSTEM

(71) Applicant: UNIVERSITY OF SEOUL INDUSTRY COOPERATION FOUNDATION, Seoul (KR)

(72) Inventors: Byung Deok Yu, Seoul (KR); Hyunsoo Min, Seoul (KR); Junjin Jeon, Gwangju (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 89 days.

(21) Appl. No.: 14/913,731

(22) PCT Filed: Nov. 19, 2013

(86) PCT No.: PCT/KR2013/010489
§ 371 (c)(1),
(2) Date: Feb. 23, 2016

(87) PCT Pub. No.: WO2015/053430
PCT Pub. Date: Apr. 16, 2015

(65) Prior Publication Data
US 2016/0209083 A1    Jul. 21, 2016

(30) Foreign Application Priority Data

Oct. 8, 2013    (KR) ......................... 10-2013-0119689

(51) Int. Cl.
*G05D 9/00* (2006.01)
*F24T 10/10* (2018.01)
(Continued)

(52) U.S. Cl.
CPC .............. *F24T 10/10* (2018.05); *F24T 10/17* (2018.05); *F24T 2010/50* (2018.05);
(Continued)

(58) Field of Classification Search
CPC .. F24J 3/081; F24J 2003/087; F24J 2003/089; F24J 3/084; F28F 1/34; F28F 2215/10; Y02E 10/12; Y02E 10/125
See application file for complete search history.

(56) References Cited

U.S. PATENT DOCUMENTS

| | | | | |
|---|---|---|---|---|
| 4,523,629 A | * | 6/1985 | Copeland | .............. F24D 11/002 |
| | | | | 126/640 |
| 6,708,494 B1 | * | 3/2004 | Hamann | .................. F03G 7/04 |
| | | | | 60/641.2 |

(Continued)

FOREIGN PATENT DOCUMENTS

| | | |
|---|---|---|
| JP | 08005162 | 1/1996 |
| JP | 2009-257737 | 11/2009 |

(Continued)

*Primary Examiner* — Travis Ruby
(74) *Attorney, Agent, or Firm* — Lex IP Meister, PLLC (57) ABSTRACT

An underground heat exchange system is provided to reduce energy consumption for circulation of a heat transfer medium and reduce construction, management, and maintenance costs. The underground heat exchange system includes: a double-pipe heat exchanger that is buried underground to convert a heat transfer medium into a usable form; a medium collector that collects the heat transfer medium that has dispersed its heat via a heat consumption area to circulate the same to the ground heat exchanger; and a plurality of circulation loops. The medium collector includes first and second reservoirs that are arranged in two tiers: upper and lower, spaced apart from each other, an upstream pump is provided in a first circulation loop between the first and second reservoirs, and the second reservoir is placed higher than the first reservoir. The ground heat exchanger may enhance heat exchange efficiency by increasing the contact area and time between the ground and the heat transfer medium.

10 Claims, 6 Drawing Sheets

(51) Int. Cl.
*F24T 10/17* (2018.01)
*F24T 10/00* (2018.01)
*F28F 1/34* (2006.01)

(52) U.S. Cl.
CPC ............ *F24T 2010/56* (2018.05); *F28F 1/34* (2013.01); *F28F 2215/10* (2013.01); *Y02E 10/12* (2013.01); *Y02E 10/125* (2013.01)

(56) References Cited

U.S. PATENT DOCUMENTS

| | | | | |
|---|---|---|---|---|
| 6,907,923 | B2* | 6/2005 | Sienel | F24D 17/02 |
| | | | | 122/437 |
| 7,490,657 | B2 | 2/2009 | Ueyama | |
| 2007/0023163 | A1* | 2/2007 | Kidwell | F24J 3/084 |
| | | | | 165/45 |
| 2008/0073058 | A1 | 3/2008 | Ueyama | |
| 2011/0061382 | A1* | 3/2011 | Stern | F24J 3/081 |
| | | | | 60/641.2 |

FOREIGN PATENT DOCUMENTS

| | | |
|---|---|---|
| KR | 10-0576394 | 4/2006 |
| KR | 10-0798127 | 1/2008 |
| KR | 10-1220531 | 1/2013 |
| KR | 10-2013-0063394 | 6/2013 |

\* cited by examiner

FIG. 1

—PRIOR ART—

UNDERGROUND HEAT-EXCHANGE SYSTEM

CROSS-REFERENCE TO RELATED APPLICATION

This application claims priority to and the benefit of Korean Patent Application No. 10-2013-0119689 filed in the Korean Intellectual Property Office on Oct. 8, 2013, the entire contents of which are incorporated herein by reference.

BACKGROUND OF THE INVENTION (a) Field of the Invention

The present invention relates to an underground heat exchange system, and more particularly, to an underground heat exchange system capable of reducing energy consumption for operating the underground heat exchange system by dividing a medium collector storing a heat transfer medium into a plurality of parts with different installation heights and inducing the heat transfer medium to circulate by potential energy of the medium collector.

(b) Description of the Related Art

Fossil fuels, and electricity generated by fossil fuels or nuclear power, are materials most commonly used for heating, cooling, and power generation, but emissions from the burning of fossil fuels are harming water quality and polluting the atmosphere, and because our limited resources are being depleted, there is an urgent need for the development of alternative energy sources.

Wind, solar, and geothermal power are the most promising energy alternatives to fossil fuels.

In particular, research on devices using these natural energy sources for cooling, heating, and power generation is actively underway. However, there is a problem in that the wind, solar, and geothermal energy sources, though unlimited in quantity, still have not reached sufficient energy density to substitute for fossil fuels.

For example, wind and solar power installations are subject to location constraints to harvest as much energy as needed, and are also subject to preconditions such as securing a unit area of a certain size or larger.

In addition, even if these preconditions are met, ensuring energy production is difficult due to environmental factors and the costs of installation, maintenance, and management are high.

On the other hand, geothermal power can ensure steady energy supply and has the benefits of reduced installation, maintenance, and management costs.

Thus, it can be assumed that more research is being applied to geothermal cooling, heating, or power generation systems than into wind and solar power generation systems.

Figure 1:
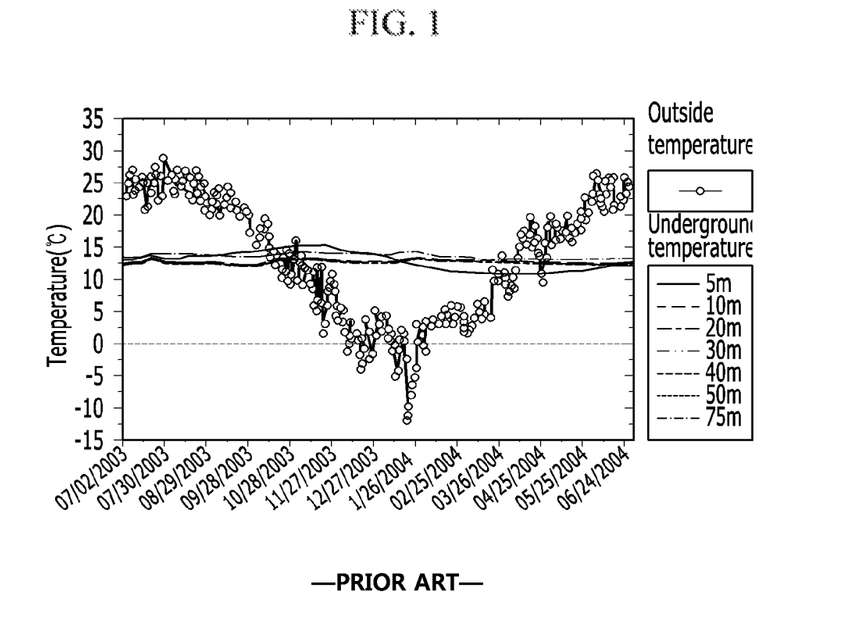
FIG. 1 is a graph showing an underground temperature distribution at different depths.

As can be seen from the graph in FIG. 1, no daily changes in temperature are shown at a depth of 1 m or less underground. Further, no annual changes in temperature depending on the season are shown at a depth of 6 to 7 m underground, and Korea's geology is known to be ideal for geothermal use because the soil is made up mostly of rock.

The temperature is kept steady at 15±5° C. all the year round at an underground depth of 10 m or less from the earth's surface, which makes the use of heat sources efficient, and the temperature at a deeper depth (of 1 to 2 km underground) in some areas is 80° C. and hence may be directly used for heating or the like.

A traditional geothermal cooling and heating system comes in the form of ground heat exchangers for heat exchange and a heat pump that uses a heat transfer medium to deliver heat from the ground to a space and cool or heat the space.

The ground heat exchangers are constructed in such a way that boreholes are dug 50 to 200 m deep at predetermined intervals, the ground heat exchangers are installed by inserting them into the boreholes, and adjacent ground heat exchangers are connected together and work in conjunction with a heat pump.

In this case, the ground heat exchangers are usually in the form of heat exchanger pipes that extend vertically so as to be inserted into the boreholes. However, the heat exchanger pipes, if formed to extend linearly, are limited in their contact area or time for heat exchange with the ground, thus decreasing heat exchange efficiency.

One of the technical solutions to these problems is the technology described in Korean Patent Laid-Open Publication No. 2013-0063394 (2013 Jun. 14, hereinafter, 'conventional art').

The conventional art relates to a ground heat exchanger and a heat exchange system using the same, and concretely discloses a technical construction that improves heat exchange efficiency by extending an underground flow path for a heat transfer medium in a predetermined shape to increase the contact area and time for heat exchange with the ground.

Although the conventional art may enhance, in part, the heat exchange efficiency of the heat transfer medium using geothermal heat, it cannot prevent energy waste caused by forcing the circulation of the heat transfer medium for heat exchange.

In particular, the ground heat exchanger according to the conventional art is constructed in the form of a pipe that bent at predetermined intervals in order to increase the contact area and time for heat exchange and this increases preliminary work for construction, such as excavation, thus resulting in high construction costs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an underground heat exchange system that improves efficiency of energy consumption required for circulating a heat transfer medium by making use of a height difference caused by a position of a medium collector to induce the heat transfer medium to circulate.

Furthermore, the present invention provides an underground heat exchange system that can enhance heat exchange efficiency and improve constructability by including a wedge- or dome-shaped double-pipe heat exchanger with inner and outer pipes and including a flow rate reducing means or collision members for creating a vortex.

In addition, an aspect of the present invention is to provide an underground heat exchange system that can automate a series of operations and quickly cope with emergency situations such as breakdowns by including a water level sensor, an upstream pump, an on-off valve, and a controller for allowing the water level sensor, upstream pump, and on-off valve to work in conjunction with one another.

An exemplary embodiment of the present invention provides an underground heat exchange system including: a double-pipe heat exchanger that is buried underground to convert a heat transfer medium into a usable form; a medium collector that collects the heat transfer medium that has dispersed its heat via a heat consumption area to circulate the same to the ground heat exchanger; and a plurality of circulation loops.

The medium collector may include first and second reservoirs that are arranged in two tiers, which are upper and lower reservoirs that are spaced apart from each other, wherein an upstream pump may be provided in a first circulation loop between the first and second reservoirs, and the second reservoir may be placed higher than the first reservoir.

The height difference between the first reservoir and the second reservoir may be set taking the depth of the ground heat exchanger, etc. into account.

An on-off valve may be further provided in a second circulation loop between the second reservoir and the ground heat exchanger, a water level sensor may be further provided in the second reservoir, and a controller may be further provided among the upstream pump, on-off valve, and water level sensor in the first and second circulation loops to allow the upstream pump, the on-off valve, and the water level sensor to work in conjunction with one another.

An intermediate reservoir may be further provided in the third circulation loop arranged between the ground heat exchanger and the heat consumption area, and the intermediate reservoir may be realized in various ways, including being placed higher than the first reservoir and lower than the second reservoir.

The ground heat exchanger may include: an inner pipe that is connected to one end of the second circulation loop running from the second reservoir; a wedge- or dome-shaped outer cylinder member that forms a double-pipe structure by the insertion and placement of the inner pipe, and that enables the heat transfer medium flowing along the outer surface of the inserted inner pipe to exchange heat with the ground; and a blocking cover that closes off the opening of the outer cylinder member, and that includes a through hole for inserting the inner pipe and an extraction port for connecting to the third circulation loop leading to the heat consumption area.

A flow rate reducing means for reducing the flow rate of the heat transfer medium may be further provided either on the outer surface of the inner pipe inserted into the outer cylinder member or on the inner periphery of the outer cylinder member, and the flow rate reducing means may be realized in various forms, including collision members for creating a vortex in the heat transfer medium.

The outer cylinder member and the flow rate reducing means may be divided into an blocking area where there is a need to block heat transfer between the heat transfer medium and the ground, and an active area where there is a need to facilitate the heat transfer between the heat transfer medium and the ground, depending on the depth to which the whole body is buried underground, and the blocking area and the active area may be made of different materials with different thermal conductivity.

The outer cylinder member may further include a heat-insulating member on the outer surface of the blocking area.

An underground heat exchange system according to an embodiment of the present invention offers technical advantages, including improving efficiency of energy consumption required for circulating a heat transfer medium, and reducing management and maintenance costs by natural circulation that makes use of the height difference caused by the position of a medium collector to induce the heat transfer medium to circulate.

Furthermore, the underground heat exchange system according to the embodiment of the present invention offers technical advantages, including making construction easy and improving heat exchange efficiency with the use of a flow rate reducing means or collision members for creating a vortex, because the underground heat exchange system includes a double-pipe heat exchanger and its outer tip is wedge- or dome-shaped.

In addition, the underground heat exchange system according to the embodiment of the present invention offers technical advantages, including automating a series of operations and quickly coping with emergency situations such as breakdowns by including a water level sensor, an upstream pump, an on-off valve, and a controller for allowing the water level sensor, the upstream pump, and the on-off valve to work in conjunction with one another.

DETAILED DESCRIPTION OF THE EMBODIMENTS

Hereinafter, the technical configuration of an underground heat exchange system according to an exemplary embodiment of the present invention will be described in detail with reference to the attached drawings.

Figure 2:
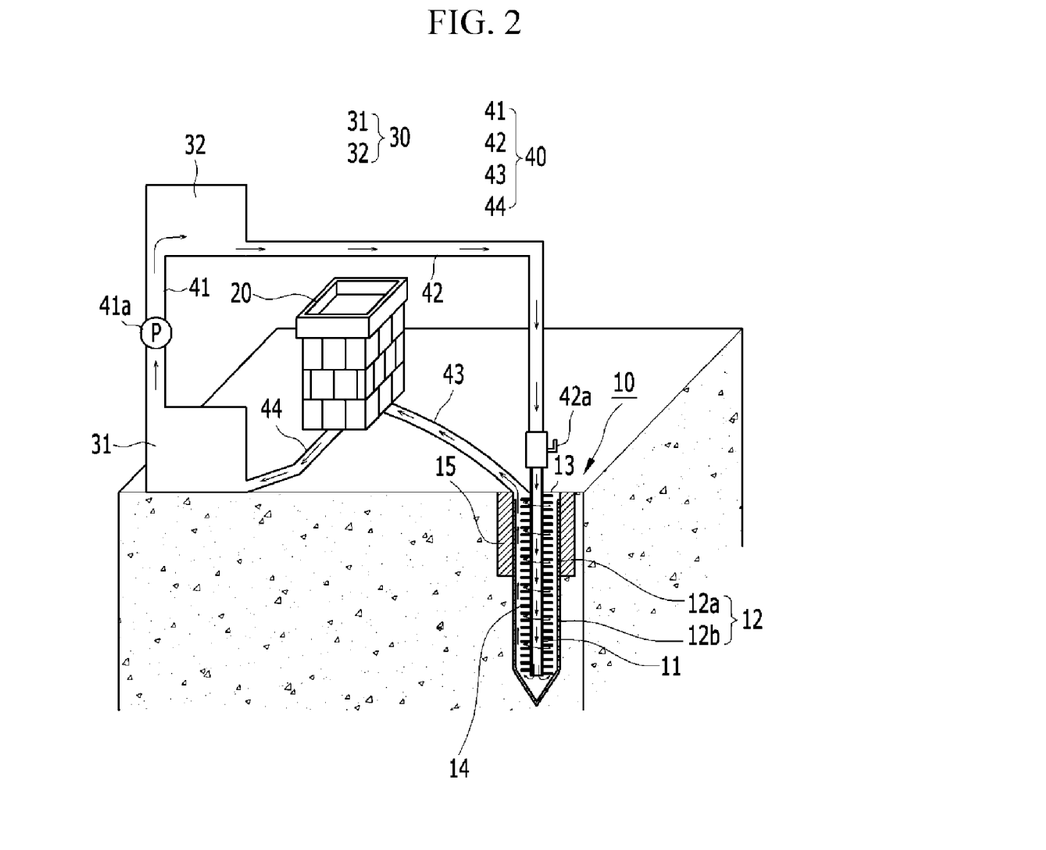
FIG. 2 is a view schematically illustrating an underground heat exchange system according to a first exemplary embodiment of the present invention.

First, as illustrated in FIG. 2, the underground heat exchange system according to the exemplary embodiment of the present invention includes a ground heat exchanger 10 for converting a heat transfer medium into a usable form, a heat consumption area 20, and a medium collector 30 that collects the heat transfer medium that has dispersed its heat via the heat consumption area 20.

A circulation loop 40 is provided among the ground heat exchanger 10, heat consumption area 20, and medium collector 30 to form a closed loop for circulating the heat transfer medium.

The ground heat exchanger 10 has a double-pipe structure that is buried underground, which allows for smooth heat transfer between the heat transfer medium and the ground.

The medium collector 30 is configured to collect the heat transfer medium that has dispersed its heat via the heat consumption area 20 to circulate it to the ground heat exchanger 10.

For example, the medium collector 30 may include first and second reservoirs 31 and 32 that are arranged in two tiers, which are upper and lower reservoirs that are spaced apart from each other. An upstream pump 41a is provided in a first circulation loop 41 that connects between the first and second reservoirs 31 and 32, and the second reservoir 32 is placed higher than the first reservoir 31.

The above technical configuration of the medium collector 30 may use convection that arises from the potential energy provided by the height of the second reservoir 32 to circulate the heat transfer medium via the ground heat exchanger 10 or the heat consumption area 20. Therefore, it ultimately provides technical features such as improving efficiency of energy consumption required for circulating the heat transfer medium and reducing maintenance and management costs.

The circulation loop is a plurality of pipes including first to fourth circulation loops 41, 42, 43, and 44. Hereinafter, for convenience of explanation, the one provided between the first and second reservoirs 31 and 32 is referred to as the first circulation loop 41, the one provided between the second reservoir 32 and the ground heat exchanger 10 is referred to as the second circulation loop 42, the one provided between the ground heat exchanger 10 and the heat consumption area 20 is referred to as the third circulation loop 43, and the one connecting from the heat consumption area 20 to the first reservoir 31 is referred to as the fourth circulation loop 44.

Preferably, the height difference between the first reservoir 31 and the second reservoir 32 is set taking the depth of the ground heat exchanger 10 and the heat transfer rate into account. For example, the height difference between the first reservoir 31 and the second reservoir 32 may be set equal to the depth of the ground heat exchanger 10 or greater thereof by a certain percentage.

An on-off valve 42a may be further provided in the second circulation loop 42 between the second reservoir 32 and the ground heat exchanger 10.

The on-off valve 42a may be provided to adjust a water level or pressure of the second reservoir 32 to a predetermined range by means of the upstream pump 41a when the heat transfer medium moves from the first reservoir 31 to the second reservoir 32.

The on-off valve 42a may be realized in various forms such as a check valve that controls the heat transfer medium to flow in only one direction.

Figure 3:
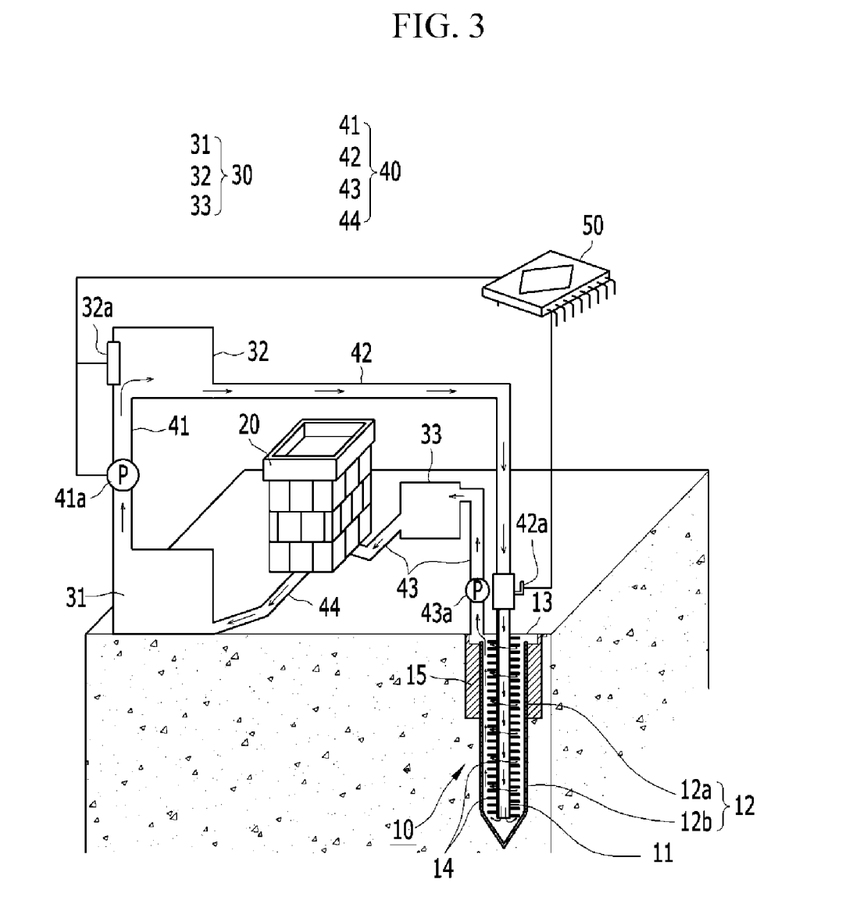
FIG. 3 is a view schematically illustrating an underground heat exchange system according to a second exemplary embodiment of the present invention.

As depicted in FIG. 3, a water level sensor 32a may be further provided at the second reservoir 32, and a controller 50 may be further provided among the upstream pump 41a, on-off valve 42a, and water level sensor 32a to allow them to work in conjunction with one another.

The controller 50 according to the exemplary embodiment of the present invention may be realized in various forms such as a microcomputer capable of automating the overall system operation and minimizing errors by coping with emergency situations such as breakdowns.

Also, as illustrated in FIG. 3, an intermediate reservoir 33 capable of storing the heat transfer medium that is converted into a usable form by the ground heat exchanger 10 may be further provided in the third circulation loop 43 arranged between the ground heat exchanger 10 and the heat consumption area 20.

The first reservoir 31, the second reservoir 32, and the intermediate reservoir 33 are in the form of tanks capable of storing the heat transfer medium.

The intermediate reservoir 33, in particular, may be placed higher than the first reservoir 31 and lower than the second reservoir 32. The intermediate reservoir 33, in particular, is placed higher than the heat consumption area 20 or the first reservoir 31, so as to allow for smooth circulation of the heat transfer medium flowing to the heat consumption area 20 or the first reservoir 31.

The intermediate reservoir 33 serves a function of quickly supplying the heat transfer medium according to the needs of the heat consumption area 20 and also a function of ensuring the supply of the heat transfer medium by expanding the number of areas of heat consumption 20.

In this case, an extraction pump 43a may be further provided in the third circulation loop 43 between the intermediate reservoir 33 and the ground heat exchanger 10. The extraction pump 43a is for extracting the heat transfer medium from the ground heat exchanger 10, and may be used in various forms such as an electric impeller-type pump or a piston compressor-type pump.

Figure 5:
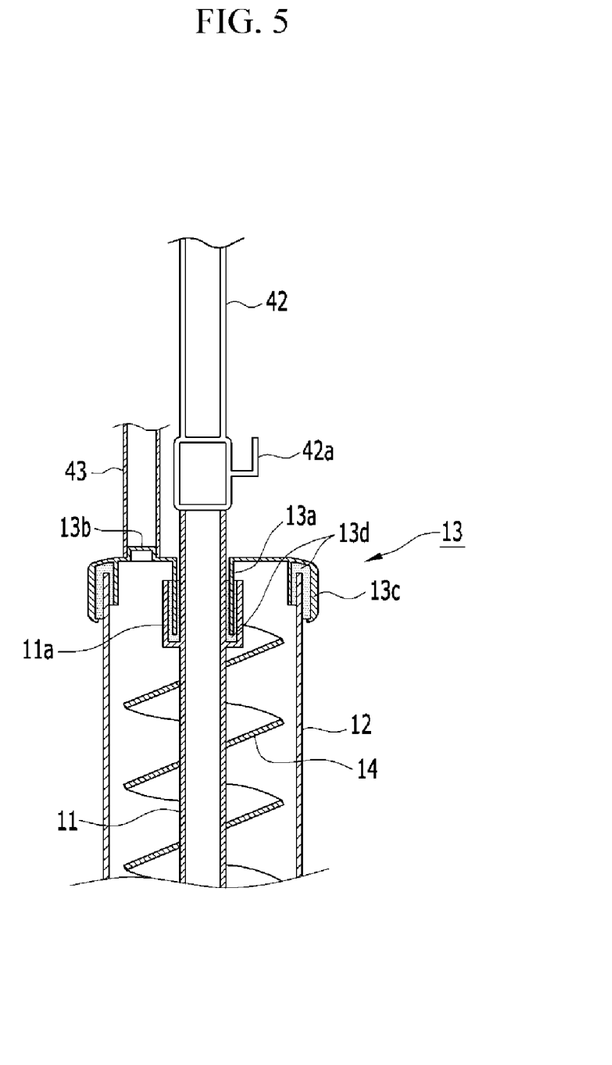
FIG. 5 is a detailed cross-sectional view illustrating how a blocking cover is attached in the underground heat exchange system according to the first exemplary embodiment of the present invention.

As illustrated in FIGS. 2 and 3 and FIG. 5, the ground heat exchanger 10 may include an inner pipe 11, an outer cylinder member 12, and a blocking cover 13.

While the inner pipe 11 is a linear pipe that is connected to the second circulation loop 42 running from the second reservoir 32, the outer cylinder member 12 is a wedge- or dome-shaped cylinder body that is open at one side and closed at the other.

The blocking cover 13 is a type of cover that closes off an opening of the outer cylinder member 12, which is configured in such a manner so as to fix the inner pipe 11 in place.

As can be seen from FIG. 5, the blocking cover 13 is configured in such a way so as to prevent impurities from getting into the opening of the outer cylinder member 12, and includes a through hole 13a for inserting and fixing the inner pipe 11 and an extraction port 13b for connecting to the third circulation loop 43.

The wedge- or dome-shaped outer cylinder member 12 facilitates underground burial, and the blocking cover 13 allows for joining the inner pipe 11 and the outer cylinder member 12 together and prevents the introduction of impurities, and therefore makes the assembly and construction of the ground heat exchanger 10 easy, thus offering technical advantages such as the ability to compress air.

The inner pipe 11 is inserted and fixed into the through hole 13a of the blocking cover 13 and placed inside the outer cylinder member 12. That is, the inner pipe 11 divides the internal space of the outer cylinder member 12, and the inner pipe 11 and the outer cylinder member 12 are configured to ultimately form a double-pipe structure.

The inner pipe 11 in the outer cylinder member 12 serves as a boundary wall that divides the flow path of the heat transfer medium, and induces the heat transfer medium introduced along the second circulation path 42 to move deep down to the bottom of the outer cylinder member 12.

Once introduced along the inner pipe 11 with one end connected to the second circulation path 42 and the other end installed at the bottom of the outer cylinder member 12, the heat transfer medium exchanges heat with the ground outside of the outer cylinder member 12 as it gradually rises along the outer surface of the inner pipe 11 in the outer cylinder member 12, and as a result, the heat transfer medium is converted into a usable form.

Figure 4:
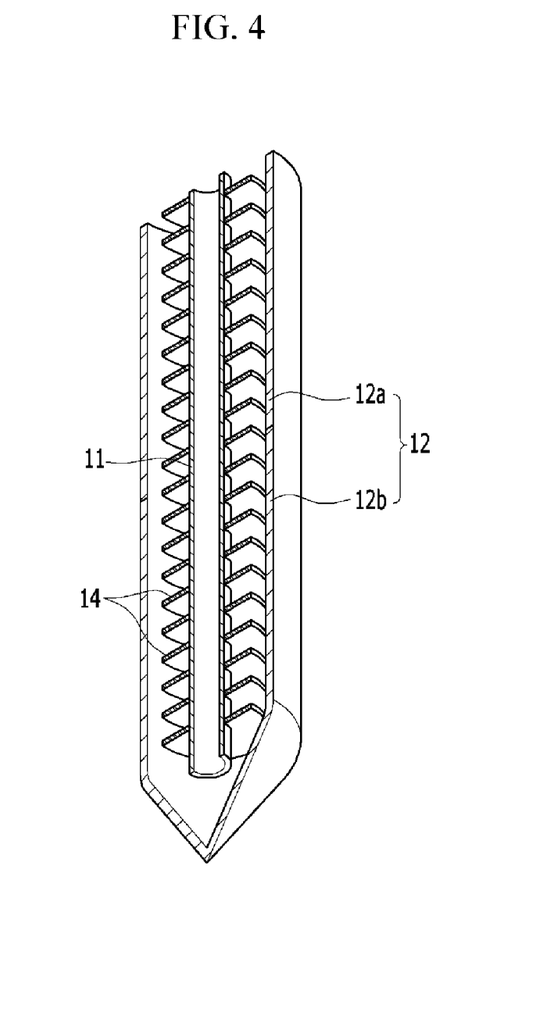
FIG. 4 is a partial cutaway perspective view of a ground heat exchanger in the underground heat exchange system according to the first exemplary embodiment of the present invention.
Figure 6:
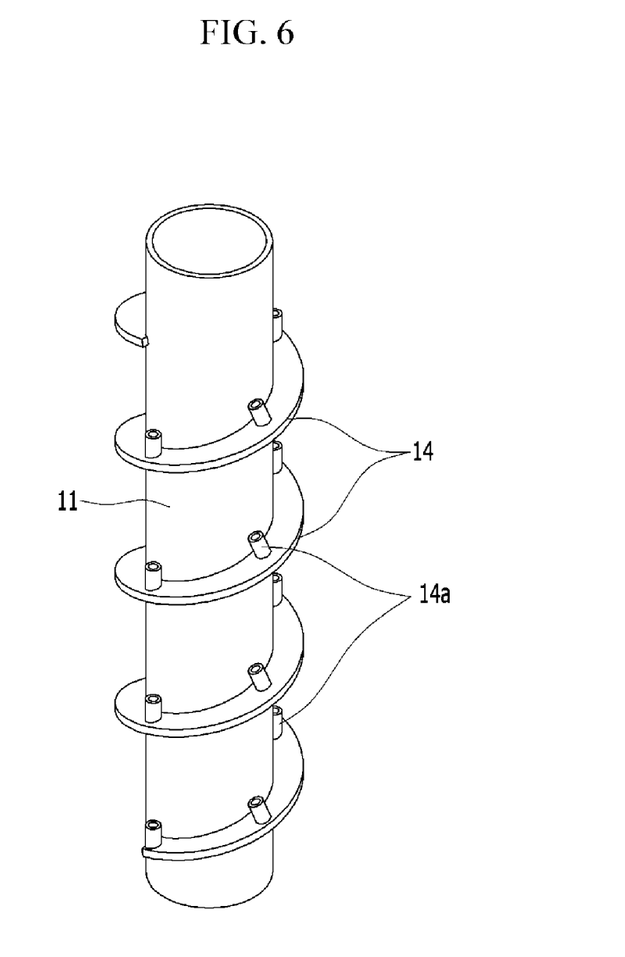
FIG. 6 is a partial perspective view illustrating a flow rate reducing means and collision members in the underground heat exchange system according to the first exemplary embodiment of the present invention.

As illustrated in FIG. 4 to FIG. 6, a flow rate reducing means 14 for reducing the flow rate, i.e., moving velocity, of the heat transfer medium may be further provided either on the outer surface of the inner pipe 11 inserted into the outer cylinder member 12 or on the inner periphery of the outer cylinder member 12.

The flow rate reducing means 14 may be realized in any form, as long as it can maximize the contact time for heat exchange with the ground by reducing the moving velocity of the heat transfer medium or maximizing the contact area between the heat transfer medium and the ground. For example, the flow rate reducing means 14 may be helical guide flanges or screw threads.

In this case, the flow rate reducing means 14 may further include collision members 14a for creating a vortex when the heat transfer medium moves, thus further enhancing heat transfer efficiency.

The collision members 14a may be protrusions or irregular bumps formed on the bottom or wall surface. That is, the collision members 14a may be realized in various forms, including protrusions or irregular bumps formed on the surfaces of helical guide flanges or screw threads.

As illustrated in FIG. 5, the blocking cover 13 may further include a fastening recess 13c corresponding to the extremity of the opening of the outer cylinder member 12, and seals 13d formed on every contact surface of the through hole 13a to ensure water-tightness and air-tightness. The seals 13d may be realized as a soft rubber or a synthetic resin.

Also, a fixing blade 11a may be further provided on the outer surface of the inner pipe 11 to ensure that the inner pipe 11 is firmly fastened to the blocking cover 13 and thus to keep the inner pipe 11 stably fixed in place.

For example, the fixing blade 11a may be in the form of a horseshoe that can be held in place by screwing it onto a flange surface forming the through hole 13a of the blocking cover 13.

As illustrated in FIGS. 2 and 3, the outer cylinder member 12 may be divided into a blocking area 12a and an active area 12b depending on the depth at which the whole body is buried underground.

The blocking area 12a refers to a part of the outer cylinder member 12 buried shallow beneath the earth's surface, where geothermal heat is sparse and therefore there is a need to block the heat transfer between the heat transfer medium and the ground, whereas the active area 12b refers to a part of the outer cylinder member 12 buried deep beneath the earth's surface, where geothermal heat is plentiful and therefore there is a need to facilitate the heat transfer between the heat transfer medium and the ground.

The body of the outer cylinder member 12 may be divided into the blocking area 12a and the active area 12b, and the blocking area 12a and the active area 12b may be made of different materials with different thermal conductivity.

For example, the active area 12b may be formed of an alloy mainly composed of gold, silver, copper, iron, or aluminum, whereas the blocking area 12a may be formed in the shape of a pipe composed of a metal or alloy with lower thermal conductivity than the active area 12b.

By configuring the blocking area 12a to be 5 to 6 m deep from the earth's surface, heat transfer may be blocked to a depth of 5 to 6 m from the surface. Hence, the overall heat exchange efficiency may be enhanced.

The outer cylinder member 12 may be configured in such a way so as to wrap the outer surface of the blocking area 12a with a heat-insulating member 15.

The heat-insulating member 15 may be made of various materials, particularly those that are inexpensive and provide excellent heat insulation. For example, the heat-insulating member 14 may be made of heat-insulation material such as polyurethane.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | | |
|---|---|---|
| 10: ground heat exchanger | 11: inner pipe | 11a: fixing blade |
| 12: outer cylinder member | 12a: blocking area | 12b: active area |
| 13: blocking cover | 13a: through-hole | 13b: extraction port |
| 13c: fastening recess | 13d: seal | 14: flow rate reducing means |
| 14a: collision member | | 15: insulation member |
| 20: heat consumption area | | 30: medium collector |
| 31: first reservoir | | 32: second reservoir |
| 32a: water level sensor | | 33: intermediate reservoir |
| 40: circulation loop | | 41: first circulation loop |
| 41a: upstream pump | | 42: second circulation loop |
| 42a: on-off valve | | 43: third circulation loop |
| 43a: extraction pump | | 44: fourth circulation loop |
| 50: controller | | |

What is claimed is:

1. An underground heat exchange system comprising:
a double-pipe ground heat exchanger that is buried underground to convert a heat transfer medium into a form of the medium having availability of heat transfer;
a medium collector that collects the heat transfer medium that has dispersed its heat via a heat consumption area to circulate the same to the ground heat exchanger; and
a plurality of circulation loops,
wherein:
the ground heat exchanger comprises an inner pipe, an outer cylinder member that forms a double-pipe structure by the insertion and placement of the inner pipe, and a blocking cover that closes off an opening of the outer cylinder member,
the medium collector comprises a first reservoir and a second reservoir that are arranged in two tiers which are upper and lower reservoirs that are spaced apart from each other,
an upstream pump is provided in a first circulation loop between the first reservoir and second reservoir, and the second reservoir is placed higher than the first reservoir,
an on-off valve is provided in a second circulation loop between the second reservoir and the ground heat exchanger to adjust a water level or a pressure of the second reservoir by means of the upstream pump,
a water level sensor is provided at the second reservoir,
a controller is provided among the upstream pump, the on-off valve, and the water level sensor to allow the upstream pump, the on-off valve, and the water level sensor to work in conjunction with one another,
an intermediate reservoir capable of storing the heat transfer medium converted by the ground heat exchanger is provided in a third circulation loop arranged between the ground heat exchanger and the heat consumption area,
the inner pipe is connected to one end of the second circulation loop running from the second reservoir,
the outer cylinder member is open at one end and closed at the other to enable the heat transfer medium flowing along an outer surface of the inner pipe to exchange a heat with a ground, the blocking cover comprises a through hole for inserting the inner pipe and an extraction port for connecting to the third circulation loop leading to the heat consumption area, and a flow rate reducing means for reducing a flow rate of the heat transfer medium is provided either on the outer surface of the inner pipe inserted into the outer cylinder member or on an inner periphery of the outer cylinder member, the flow rate reducing means being in a form of helical guide flanges or screw threads and further comprising collision members for creating a vortex in the heat transfer medium.

2. The underground heat exchange system of claim 1, wherein a height difference between the first reservoir and the second reservoir is determined based on a depth of the ground heat exchanger and a heat transfer rate.

3. The underground heat exchange system of claim 1, wherein the intermediate reservoir is placed higher than the first reservoir and lower than the second reservoir.

4. The underground heat exchange system of claim 1, wherein an extraction pump is further provided in the third circulation loop between the intermediate reservoir and the ground heat exchanger to extract the heat transfer medium from the ground heat exchanger.

5. The underground heat exchange system of claim 1, wherein the blocking cover further comprises: a fastening recess corresponding to the extremity of the opening of the outer cylinder member; and seals formed on every contact surface of the through hole to ensure water-tightness and air-tightness.

6. The underground heat exchange system of claim 1, wherein a fixing blade is further provided on the outer surface of the inner pipe so as to be held in place by being screwed onto a flange surface of the through hole of the blocking cover.

7. The underground heat exchange system of claim 1, wherein the collision members are protrusions or irregular bumps formed on the bottom or wall surface.

8. The underground heat exchange system of claim 1, wherein the outer cylinder member is divided into a blocking area where blocks the heat transfer between the heat transfer medium and the ground, and an active area where facilitates the heat transfer between the heat transfer medium and the ground, depending on a depth to which the whole body is buried underground, and the blocking area and the active area are made of different materials having different thermal conductivity.

9. The underground heat exchange system of claim 8, wherein the blocking area of the outer cylinder member is 5 to 6 m deep from the opening.

10. The underground heat exchange system of claim 9, wherein the outer cylinder member is configured in such a way so as to wrap the outer surface of the blocking area with an insulation member.

* * * * *